(12) United States Patent  
Paire

(10) Patent No.: US 12,035,868 B2
(45) Date of Patent: Jul. 16, 2024

(54) SYSTEMS FOR PREVENTION OF ACCIDENTAL CONTROL INPUTS IN APPLIANCES

(71) Applicant: Haier US Appliance Solutions, Inc., Wilmington, DE (US)

(72) Inventor: Spencer Christian Paire, Louisville, KY (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 178 days.

(21) Appl. No.: 17/720,783

(22) Filed: Apr. 14, 2022

(65) Prior Publication Data

US 2023/0329517 A1 Oct. 19, 2023

(51) Int. Cl.
*A47L 15/42* (2006.01)
*G01D 5/244* (2006.01)

(52) U.S. Cl.
CPC ....... *A47L 15/4259* (2013.01); *A47L 15/4274* (2013.01); *A47L 15/4293* (2013.01); *G01D 5/244* (2013.01); *A47L 2401/26* (2013.01); *A47L 2501/36* (2013.01)

(58) Field of Classification Search
None
See application file for complete search history.

(56) References Cited

U.S. PATENT DOCUMENTS 9,378,630 B2 6/2016 Smith
9,879,463 B2 * 1/2018 Lombrozo ............. E05B 79/20
2014/0015814 A1 1/2014 Santana et al.
2019/0150701 A1 5/2019 Chirumbolo et al.
2021/0113051 A1 4/2021 Hodapp, Jr.
2021/0131161 A1 * 5/2021 Contreras ............... E05F 15/70

FOREIGN PATENT DOCUMENTS

CN 108852233 A 11/2018
DE 102006036551 A1 2/2008
DE 102012209679 A1 12/2013

OTHER PUBLICATIONS

How to Choose the Right Mechanical Cable Pulleys; CarlStahl Sava Industries; https://www.savacable.com/blog/how-to-choose-the-right-mechanical-cable-pulleys#:~:text=Steel%20pulleys%20can%20be%20made%20of%20plated%2C,its%20diameter%20when%20selecting%20a%20pulley%20for (Year: 2020).*

* cited by examiner

Primary Examiner — Rita P Adhlakha
(74) Attorney, Agent, or Firm — Dority & Manning, P.A.

(57) ABSTRACT

A dishwashing appliance includes a tub defining a wash chamber and a door rotatably mounted to the tub. The door is configured to rotate between an open position and a closed position. A user interface mounted on the door, and a controller is in signal communication with the user interface. A pulley is mounted to the tub and a cord is coupled to the door. The cord configured to rotate the pulley when the door is rotated between the open position and the closed position. A magnet is mounted to the pulley. The magnet is configured to rotate with the pulley as the door is rotated. A sensor is mounted to the tub proximate the pulley. The sensor is configured to detect the position of the magnet, and the controller is configured to disable the user interface based at least in part on the position of the magnet.

20 Claims, 7 Drawing Sheets

SYSTEMS FOR PREVENTION OF ACCIDENTAL CONTROL INPUTS IN APPLIANCES

FIELD OF THE INVENTION

The present subject matter relates generally to systems for preventing accidental control inputs in appliance.

BACKGROUND OF THE INVENTION

Dishwashers assist with cleaning of various items, including dishes, tableware, glassware, pots, pans, and utensils. During operation, a sump of the dishwasher is frequently filled with a wash fluid, such as a mix of water and detergent, which is pumped to one or more sprayers in order to clean items within the dishwasher with the cleaning mixture.

Conventionally, operation of dishwashers is initiated by a user interacting with the controls provided on the appliance. The controls may be in the form of electrical controls or mechanical controls. Accidental touch of the controls is a well-known issue in the art that has specifically plagued capacitive touch controls. A user may accidentally change settings by standing too close to or bumping into the open door of the dishwasher. This may also happen when a user accidentally grabs the controls while opening or closing the door. Such accidental inputs can lead to user annoyance, confusion, poor wash performance, or even malfunction of the appliance.

BRIEF DESCRIPTION OF THE INVENTION

Aspects and advantages of the invention will be set forth in part in the following description, or may be apparent from the description, or may be learned through practice of the invention.

In an example embodiment, a dishwashing appliance includes a tub defining a wash chamber and a door rotatably mounted to the tub. The door is configured to rotate between an open position and a closed position. A user interface mounted on the door, and a controller is in signal communication with the user interface. A pulley is mounted to the tub and a cord is coupled to the door. The cord configured to rotate the pulley when the door is rotated between the open position and the closed position. A magnet is mounted to the pulley. The magnet configured to rotate with the pulley as the door is rotated. A sensor is mounted to the tub proximate the pulley. The sensor is configured to detect the position of the magnet, and the controller is configured to disable the user interface based at least in part on the position of the magnet.

In another example embodiment, an appliance includes a tub defining a wash chamber and a door rotatably mounted to the tub. The door is configured to rotate between an open position and a closed position. A user interface is mounted on the door, and a controller is in signal communication with the user interface. A pulley is mounted to the tub, and the pulley is configured to rotate when the door is rotated between the open position and the closed position. A magnet is mounted to the pulley and is configured to rotate with the pulley as the door is rotated. A sensor is mounted to the tub proximate the pulley. The sensor is configured to detect the position of the magnet, and the controller is configured to disable the user interface based at least in part on the position of the magnet.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

Figure 1:
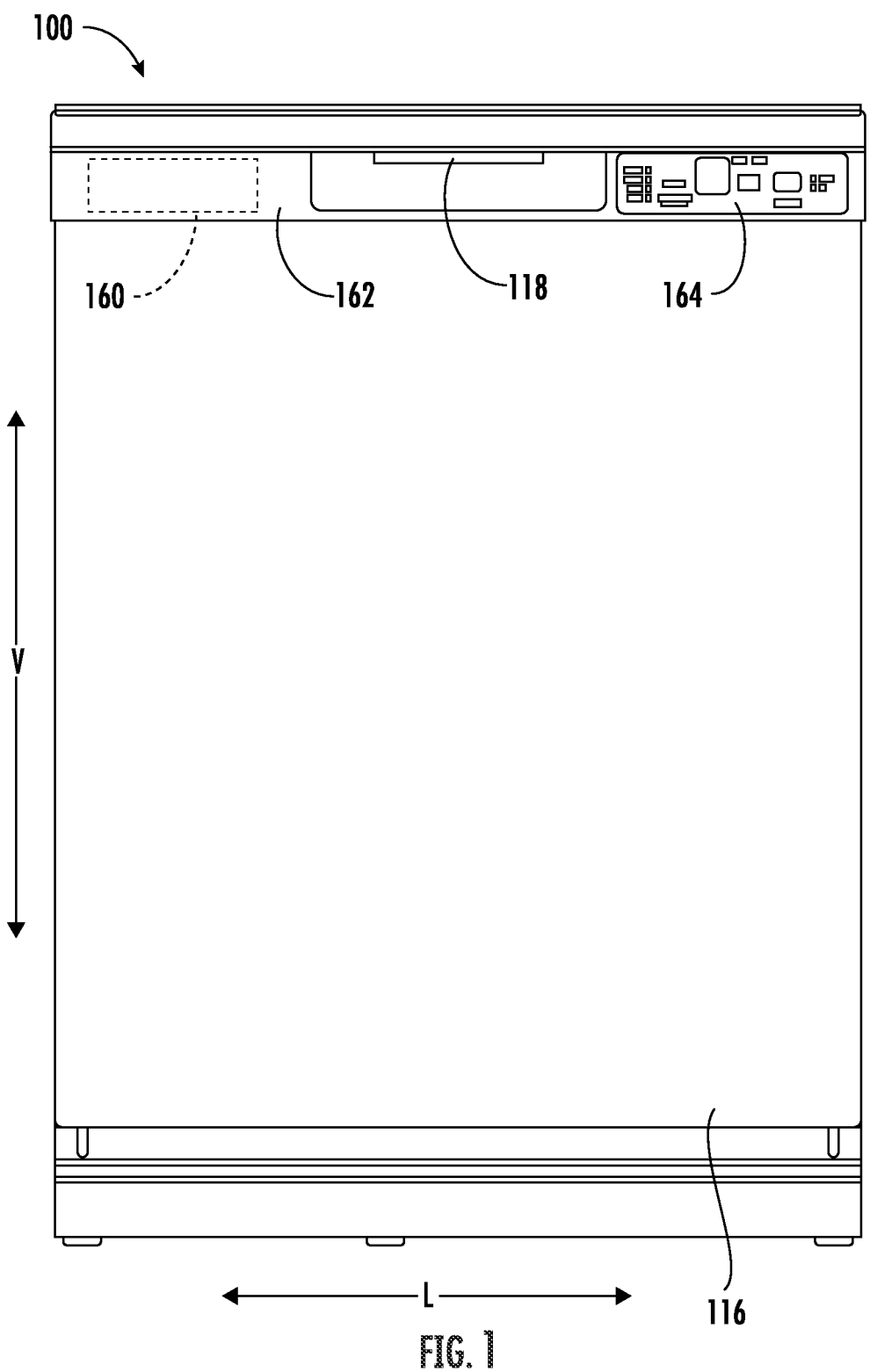
FIG. 1 provides a front view of an example embodiment of a dishwashing appliance of the present disclosure.

Repeat use of reference characters in the present specification and drawings is intended to represent the same or analogous features or elements of the present invention.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the term "or" is generally intended to be inclusive (i.e., "A or B" is intended to mean "A or B or both"). The terms "first," "second," and "third" may be used interchangeably to distinguish one component from another and are not intended to signify location or importance of the individual components. The terms "upstream" and "downstream" refer to the relative flow direction with respect to fluid flow in a fluid pathway. For instance, "upstream" refers to the flow direction from which the fluid flows, and "downstream" refers to the flow direction to which the fluid flows. The term "article" may refer to, but need not be limited to dishes, pots, pans, silverware, and other cooking utensils and items that can be cleaned in a dishwashing appliance.

The term "wash cycle" is used to refer to an overall operation of the dishwashing appliance which may include two or more distinct phases. The term "wash phase" is intended to refer to one or more periods of time during which a dishwashing appliance operates while containing the articles to be washed and uses a wash liquid (e.g., water, detergent, or wash additive) and may be a portion of the wash cycle, such as a beginning or early portion of the wash cycle. The term "rinse phase" is intended to refer to one or more periods of time during which the dishwashing appliance operates to remove residual soil, detergents, and other undesirable elements that were retained by the articles after completion of the wash phase and may be a portion of the wash cycle, such as an intermediate portion of the wash cycle. The term "drain phase" is intended to refer to one or more periods of time during which the dishwashing appliance operates to discharge soiled water from the dishwashing appliance and may be a portion of the wash cycle, such as a later portion of the wash cycle. The term "wash liquid" refers to a liquid used for washing or rinsing the articles that is typically made up of water and may include additives, such as detergent or other treatments (e.g., rinse aid). Furthermore, as used herein, terms of approximation, such as "generally," "approximately," "substantially," or "about," refer to being within a ten percent (10%) margin of error. When used in the context of an angle or direction, such terms include within ten degrees greater or less than the stated angle or direction, e.g., "generally vertical" includes forming an angle of up to ten degrees in any direction, e.g., clockwise or counterclockwise, with the vertical direction V.

Figure 2:
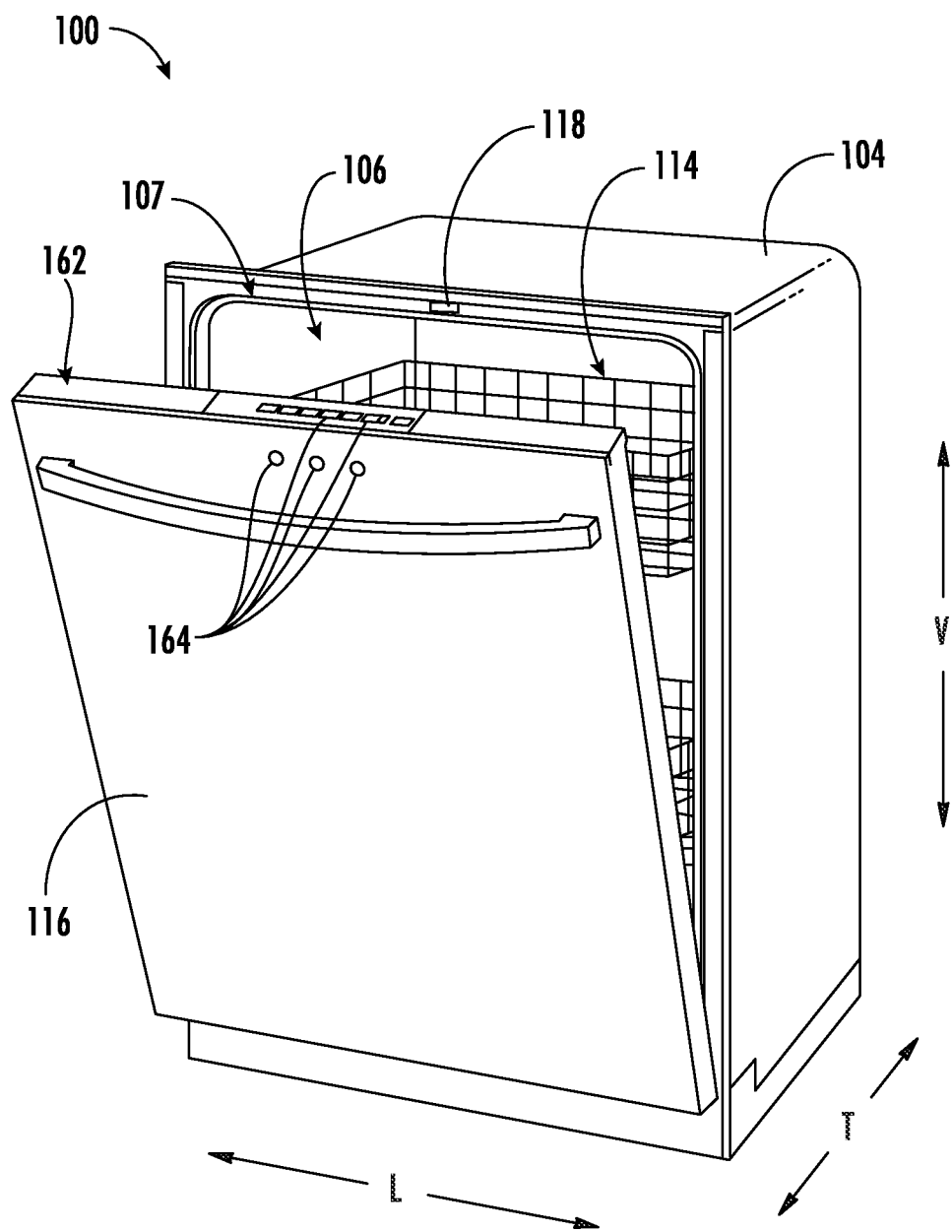
FIG. 2 provides a perspective view of the example dishwashing appliance of FIG. 1 with a door in an intermediate position.
Figure 3:
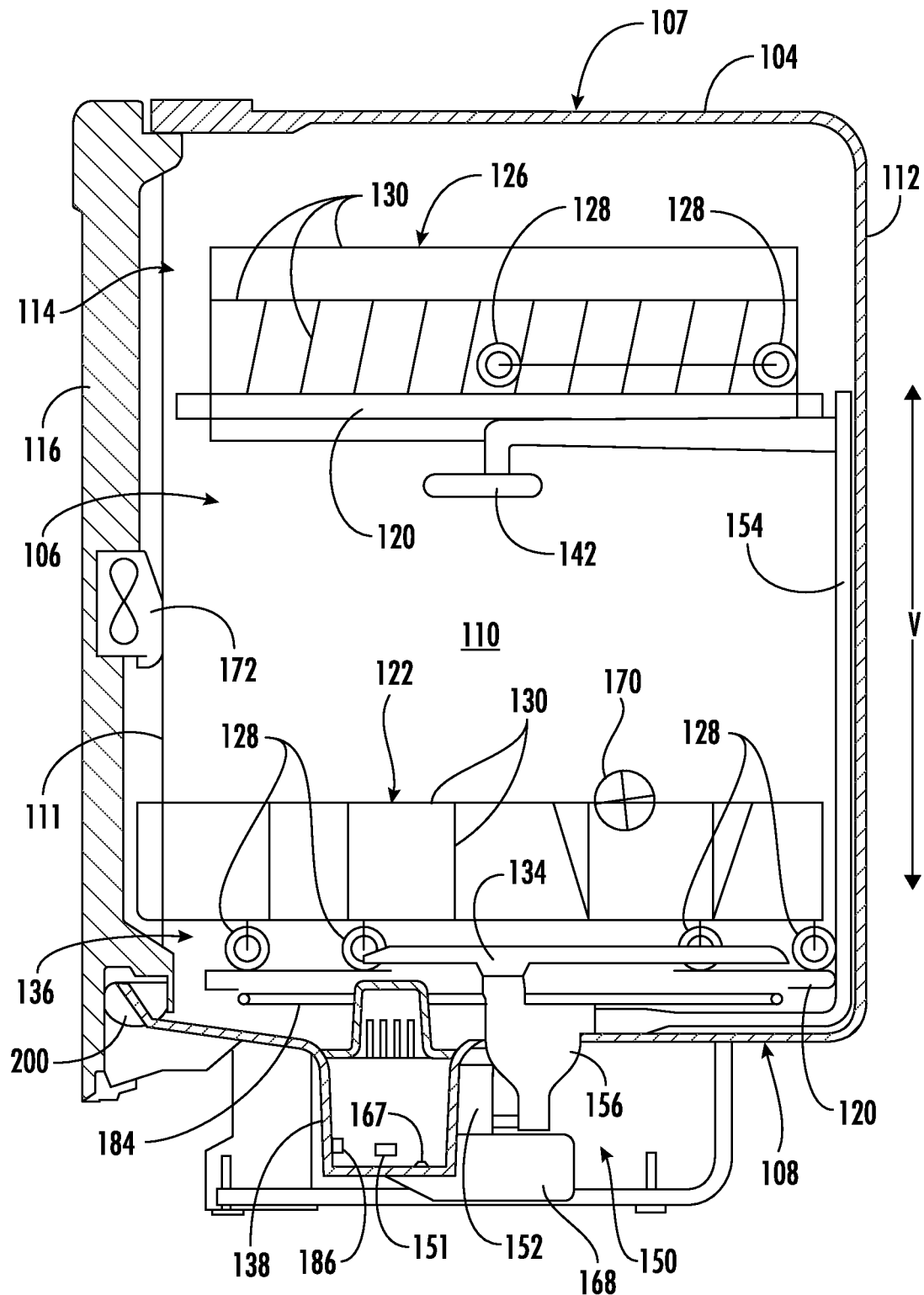
FIG. 3 provides a side, cross section view of the example dishwashing appliance of FIG. 1.

Turning now to the figures, FIGS. 1 through 3 depict an exemplary dishwasher or dishwashing appliance (e.g., dishwashing appliance 100) that may be configured in accordance with aspects of the present disclosure. Generally, dishwasher 100 defines a vertical direction V, a lateral direction L, and a transverse direction T. Each of the vertical direction V, lateral direction L, and transverse direction T are mutually perpendicular to one another and form an orthogonal direction system.

Dishwasher 100 includes a tub 104 that defines a wash chamber 106 therein. As shown in FIG. 3, tub 104 extends between a top 107 and a bottom 108 along the vertical direction V, between a pair of side walls 110 along the lateral direction L, and between a front side 111 and a rear side 112 along the transverse direction T.

Tub 104 includes a front opening 114 at the front side 111. In some embodiments, the dishwashing appliance 100 may also include a door 116 at the front opening 114. The door 116 may, for example, be coupled to the tub 104 by a hinge 200 at its bottom for movement between a normally closed vertical position (FIGS. 1 and 3), wherein the wash chamber 106 is sealed shut for washing operation, and a horizontal open position (not shown) for loading and unloading of articles from dishwasher 100. A door closure latch 118, e.g., may be provided to lock and unlock door 116 for accessing and sealing wash chamber 106.

In exemplary embodiments, tub side walls 110 accommodate a plurality of rack assemblies. For instance, guide rails 120 may be mounted to side walls 110 for supporting a lower rack assembly 122 and an upper rack assembly 126. In some such embodiments, upper rack assembly 126 is positioned at a top portion of wash chamber 106 above lower rack assembly 122 along the vertical direction V.

Generally, each rack assembly 122, 126 may be adapted for movement between an extended loading position (not shown) in which the rack is substantially positioned outside the wash chamber 106, and a retracted position (shown in FIGS. 1 through 3) in which the rack is located inside the wash chamber 106. In some embodiments, movement is facilitated, for instance, by rollers 128 mounted onto rack assemblies 122, 126, respectively.

Although guide rails 120 and rollers 128 are illustrated herein as facilitating movement of the respective rack assemblies 122, 126, it should be appreciated that any suitable sliding mechanism or member may be used according to alternative embodiments.

In optional embodiments, some or all of the rack assemblies 122, 126 are fabricated into lattice structures including a plurality of wires or elongated members 130 (for clarity of illustration, not all elongated members making up rack assemblies 122, 126 are shown). In this regard, rack assemblies 122, 126 are generally configured for supporting articles within wash chamber 106 while allowing a flow of wash liquid to reach and impinge on those articles (e.g., during a cleaning or rinsing phase of the wash cycle). According to additional or alternative embodiments, a silverware basket (not shown) may be removably attached to a rack assembly (e.g., lower rack assembly 122), for placement of silverware, utensils, and the like, that are otherwise too small to be accommodated by the rack assembly.

Generally, dishwasher 100 includes one or more spray assemblies for urging a flow of fluid (e.g., wash liquid) onto the articles placed within wash chamber 106.

In exemplary embodiments, dishwasher 100 includes a lower spray arm assembly 134 disposed in a lower region 136 of wash chamber 106 and above a sump 138 so as to rotate in relatively close proximity to lower rack assembly 122. In this regard, lower spray arm assembly 134 may generally be configured for urging a flow of wash liquid up through lower rack assembly 122.

In some embodiments, an upper spray assembly 142 may be located proximate to and, e.g., below, upper rack assembly 126 along the vertical direction V. In this manner, upper spray assembly 142 may be generally configured for urging of wash liquid up through upper rack assembly 126.

The various spray assemblies and manifolds described herein may be part of a fluid distribution system or fluid circulation assembly 150 for circulating wash liquid in tub 104. In certain embodiments, fluid circulation assembly 150 includes a circulation pump 152 for circulating wash liquid in tub 104. Circulation pump 152 may be mounted to sump 138 and in fluid communication with the sump 138 through a circulation outlet 151 from the sump 138.

When assembled, circulation pump 152 may be in fluid communication with an external water supply line (not shown) and sump 138. A water inlet valve (not shown) can be positioned between the external water supply line and circulation pump 152 (e.g., to selectively allow water to flow from the external water supply line to circulation pump 152). Additionally or alternatively, water inlet valve can be positioned between the external water supply line and sump 138 (e.g., to selectively allow water to flow from the external water supply line to sump 138). During use, water inlet valve may be selectively controlled to open to allow the flow of water into dishwasher 100 and may be selectively controlled to close and thereby cease the flow of water into dishwasher 100. Further, fluid circulation assembly 150 may include one or more fluid conduits or circulation piping for directing wash fluid from circulation pump 152 to the various spray assemblies and manifolds. In exemplary embodiments, such as that shown in FIG. 3, a primary supply conduit 154 extends from circulation pump 152, along rear side 112 of tub 104 along the vertical direction V to supply wash liquid throughout wash chamber 106.

In optional embodiments, circulation pump 152 urges or pumps wash liquid to a diverter 156 (FIG. 3). In some such embodiments, diverter 156 is positioned within sump 138 of dishwashing appliance 100). Diverter 156 may include a diverter disk (not shown) disposed within a diverter chamber 158 for selectively distributing the wash liquid to the spray assemblies 134, 142, or other spray manifolds or assemblies. For instance, the diverter disk may have at least one aperture configured to align with one or more outlet ports (not shown) at the top of diverter chamber 158. In this manner, the diverter disk may be selectively rotated to provide wash liquid to the desired spray device(s).

In exemplary embodiments, diverter 156 is configured for selectively distributing the flow of wash liquid from circulation pump 152 to various fluid supply conduits-only some of which are illustrated in FIG. 3 for clarity. In certain embodiments, diverter 156 includes two or more outlet ports (not shown) for supplying wash liquid to a first conduit for rotating lower spray arm assembly 134 and a second conduit for supplying upper spray assembly 142 (e.g., supply conduit 154). Additional embodiments may also include one or more additional conduits, e.g., a third conduit for spraying an auxiliary rack such as a silverware rack, etc.

In some embodiments, a supply conduit 154 is used to supply wash liquid to one or more spray assemblies (e.g., to upper spray assembly 142). It should be appreciated, however, that according to alternative embodiments, any other suitable plumbing configuration may be used to supply wash liquid throughout the various spray manifolds and assemblies described herein. For instance, according to another exemplary embodiment, supply conduit 154 could be used to provide wash liquid to lower spray arm assembly 134 and a dedicated secondary supply conduit (not shown) could be utilized to provide wash liquid to upper spray assembly 142. Other plumbing configurations may be used for providing wash liquid to the various spray devices and manifolds at any location within dishwashing appliance 100.

Each spray assembly 134 and 142, or other spray device as may be included in dishwashing appliance 100, may include an arrangement of discharge ports or orifices for directing wash liquid received from circulation pump 152 onto dishes or other articles located in wash chamber 106. The arrangement of the discharge ports, also referred to as jets, apertures, or orifices, may provide a rotational force by virtue of wash liquid flowing through the discharge ports. Alternatively, spray assemblies 134, 142 may be motor-driven, or may operate using any other suitable drive mechanism. Spray manifolds and assemblies may also be stationary. The resultant movement of the spray assemblies 134, 142 and the spray from fixed manifolds provides coverage of dishes and other dishwasher contents with a washing spray. Other configurations of spray assemblies may be used as well. For instance, dishwasher 100 may have additional spray assemblies for cleaning silverware, for scouring casserole dishes, for spraying pots and pans, for cleaning bottles, etc.

Drainage of soiled wash liquid within sump 138 may by provided, for instance, by a drain pump 168 (e.g., during or as part of a drain phase). In particular, wash liquid may exit sump 138 through a drain outlet 167 and may flow through a drain conduit or directly to the drain pump 168. Thus, drain pump 168 is downstream of sump 138 and facilitates drainage of the soiled wash liquid by urging or pumping the wash liquid to a drain line external to dishwasher 100.

In some embodiments, a filter assembly may be provided, e.g., in the sump 138 and/or at a top entrance into the sump 138, e.g., to filter fluid to circulation assembly 150 and/or drain pump 168. Generally, the filter assembly removes soiled particles from the liquid that flows to the sump 138 from the wash chamber 106 during operation of dishwashing appliance 100. In exemplary embodiments, the filter assembly may include both a first filter (also referred to as a "coarse filter") and a second filter (also referred to as a "fine filter").

Although a separate circulation pump 152 and drain pump 168 are described herein, it is understood that other suitable pump configurations (e.g., using only a single pump for both recirculation and draining) may be provided.

The dishwashing appliance 100 may further include a heating element 184, such as a resistance heating element, positioned in or near the sump 138. For example, the heating element 184 may be positioned "near" the sump 138 in that the heating element 184 is disposed above the sump 138 and within the lower region 136 of wash chamber 106, such as below the lower spray arm 134 and/or below the lower rack assembly 122. The heating element 184 may be positioned and configured to heat liquid in the sump 138, such as for a heated wash phase, and/or to heat air within the wash chamber 106, such as for drying articles during a dry phase.

Dishwashing appliance 100 may also include ventilation features, e.g., to promote improved, e.g., more rapid, drying of articles therein after the wash and rinse phases. For example, one or more vents 170 may be provided in the tub 104 for introducing relatively dry air from outside of the tub 104 into the wash chamber 106 and/or for removing relatively humid air from the wash chamber 106 to the outside of the tub 104. In some embodiments, a fan 172 may be provided. The fan 172 may be operable to urge air through the wash chamber 106, such as to promote air circulation and/or ventilation within and through the wash chamber. Such air movement may increase the rate of evaporation of moisture from articles in the wash chamber 106 after a wash and/or rinse phase.

In certain embodiments, dishwasher 100 includes a controller 160 configured to regulate operation of dishwasher 100 (e.g., initiate one or more wash operations). Controller 160 may include one or more memory devices and one or more microprocessors, such as general or special purpose microprocessors operable to execute programming instructions or micro-control code associated with a wash operation or wash cycle that may include a pre-wash phase, a wash phase, a rinse phase, a drain phase, and/or a dry phase. The memory may represent random access memory such as DRAM, or read only memory such as ROM or FLASH. In some embodiments, the processor executes programming instructions stored in memory. The memory may be a separate component from the processor or may be included onboard within the processor. Alternatively, controller 160 may be constructed without using a microprocessor, e.g., using a combination of discrete analog or digital logic circuitry-such as switches, amplifiers, integrators, comparators, flip-flops, AND gates, and the like—to perform control functionality instead of relying upon software. It should be noted that controllers as disclosed herein are capable of and may be operable to perform any methods and associated method steps as disclosed herein.

Controller 160 may be positioned in a variety of locations throughout dishwasher 100. In optional embodiments, controller 160 is located within a control panel area 162 of door 116 (e.g., as shown in FIG. 1 or FIG. 2). Input/output ("I/O") signals may be routed between the control system and various operational components of dishwasher 100 along wiring harnesses that may be routed through the bottom of door 116. Typically, the controller 160 includes or is operatively coupled to a user interface panel/controls 164 through which a user may select various operational features and modes and monitor progress of dishwasher 100. In some embodiments, user interface 164 includes a general purpose I/O ("GPIO") device or functional block. In additional or alternative embodiments, user interface 164 includes input components, such as one or more of a variety of electrical, mechanical or electro-mechanical input devices including rotary dials, push buttons, and capacitive touch controls, e.g., touchscreen. In further additional or alternative embodiments, user interface 164 includes a display component, such as a digital or analog display device designed to provide operational feedback to a user. When assembled, user interface 164 may be in operative communication with the controller 160 via one or more signal lines or shared communication busses.

The dishwashing appliance 100 may also include a temperature sensor 186 in operative communication with the controller 160. For example, in some embodiments, the temperature sensor 186 may be located in the sump 138 and may thereby be operable to measure a temperature of a liquid, e.g., wash liquid, within the sump 138. For example, the "temperature sensor" may include any suitable type of temperature measuring system or device positioned at any suitable location for measuring the desired temperature. Thus, for example, temperature sensor 186 may be any suitable type of temperature sensor, such as a thermistor, a thermocouple, a resistance temperature detector, a semiconductor-based integrated circuit temperature sensor, etc. In addition, temperature sensor 186 may be positioned at any suitable location and may output a signal, such as a voltage, to the controller 160 that is proportional to and/or indicative of the temperature being measured. Although exemplary positioning of the temperature sensor 186 is described herein and depicted in FIG. 3, it should be appreciated that dishwashing appliance 100 may include any other suitable number, type, and position of temperature, humidity, and/or other sensors as well as or instead of the exemplary temperature sensor 186 according to alternative embodiments.

It should be appreciated that the invention is not limited to any particular style, model, or configuration of dishwasher 100. The exemplary embodiments depicted in FIGS. 1 through 3 are for illustrative purposes only. For instance, different locations may be provided for control panel area 162 (e.g., on the front of the door 116 as illustrated in FIG. 1 or on the top of the door 116 as illustrated in FIG. 2, or other locations as well), different configurations may be provided for rack assemblies 122, 126, different spray assemblies 134, 142 and spray manifold configurations may be used, different sensors may be used, and other differences may be applied while remaining within the scope of the present disclosure.

Figure 4:
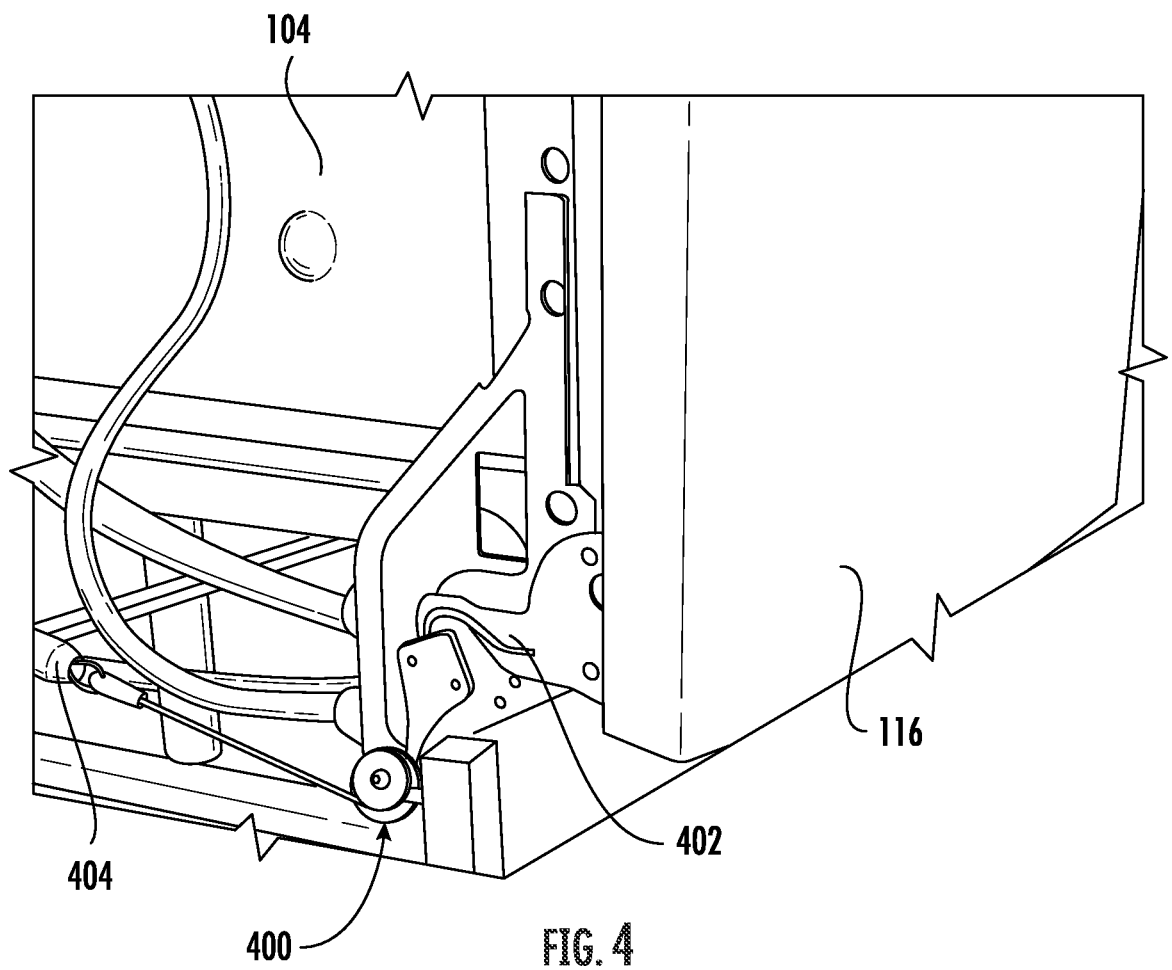
FIG. 4 provides a partial, perspective view of the example dishwashing appliance of FIG. 1 with a door in a closed position.
Figure 5:
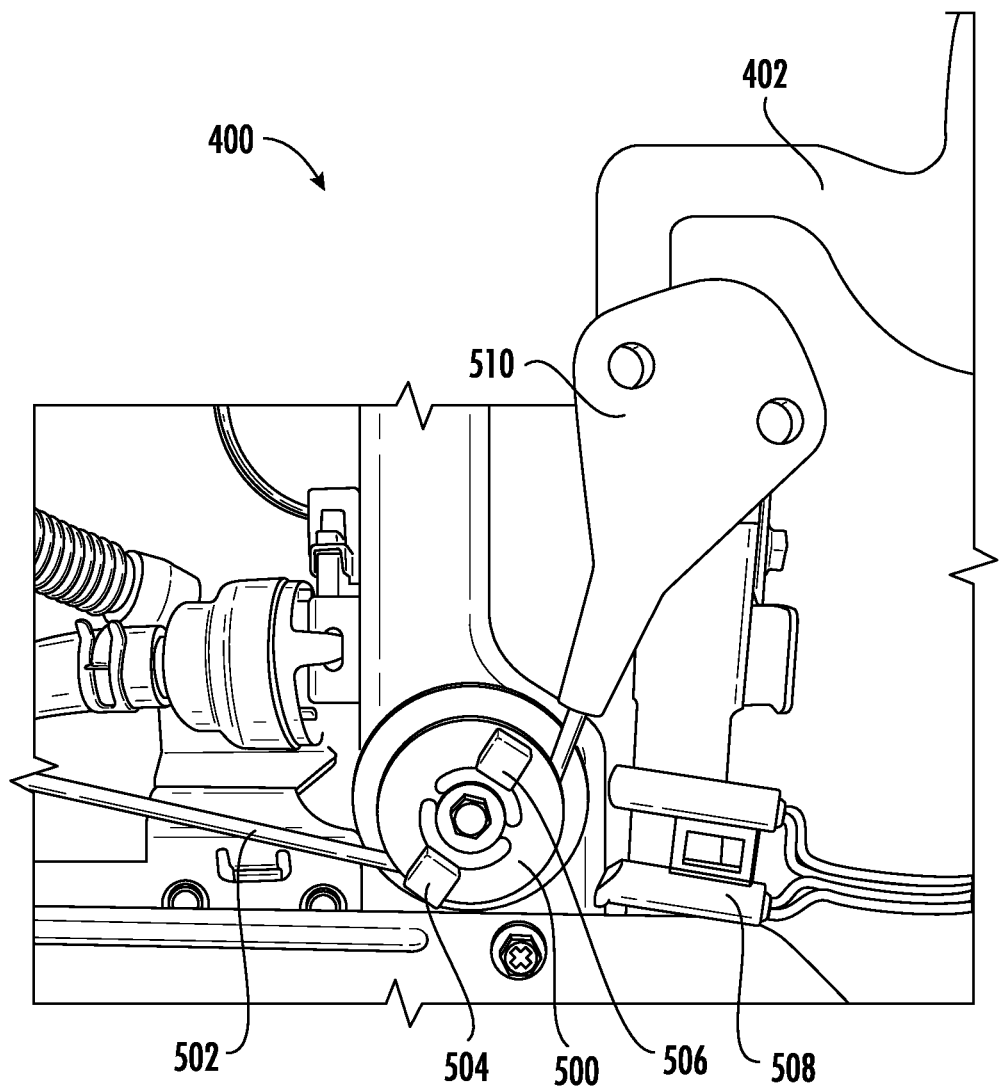
FIG. 5 provides a side, plan view of an example pulley system of the example embodiment in FIG. 4.

Turning to FIGS. 4 and 5, a hinge panel 402 may rotatably mount door 116 to tub 104. Hinge panel 402 also may be coupled to a pully assembly 400, such that as door 116 rotates pulley 400 rotates with door 116. FIG. 5 illustrates a wheel 500 of pulley assembly 400, around which a cord 502 is tensioned. In some example embodiments, cord 502 may be a steel cable or a nylon rope. On wheel 500, a first magnet 504 and a second magnet 506 may be adhered. It will be appreciated by one skilled in the art that there are other ways to couple first magnet 504 and second magnet 506 to wheel 500, such as fastening, embedding, etc., and adhering is provided by way of example only. A sensor 508 may be mounted to tub 104. Sensor 508 may be positioned such that sensor 508 is directed and/or angled toward first magnet 504 and second magnet 506 of wheel 500. Sensor 508 may be an encoder, such as a magnetic rotary encoder. Sensor 508 may be configured to read modulation or pulses in magnetic field strength, e.g., either as a continuously varying field strength, in discrete steps in strength, or as a binary above-or-below threshold measurement as a measure of the rotation of pully 400. In another example embodiment, there may be a plurality of such modulations or pulses, according to the configuration of the plurality of magnets. In other example embodiments, a plurality of sensors 508 may be used to facilitate more accurate positional readings of magnets 504, 506. One or more additional magnets may be used with magnets 504, 506 for better accuracy.

Fixed at one end of cord 502 may be a mounting flange 510. The other, opposite end, of cord 502 may be coupled to a spring 404, generally in tension while door 116 is in the closed position and open position. Mounting flange 510 may couple to hinge panel 402, so that when door 116 rotates to the open position or the closed position, mounting flange 510 rotates with hinge panel 402, pulling cord 502 around wheel 500, and thus rotating first magnet 504 and second magnet 506 of wheel 500. As may be seen from the above, cord 502 may couple door 116 to wheel 500 such that rotation of door 116 is transferred to wheel 500 via cord 502.

Turning to FIGS. 6-9, illustrated is the operation of sensor 508 as wheel 500 rotates. Sensor 508 may be attached to the dishwasher structure, such as tub 104, and may be used to detect the rotation of first magnet 504 and second magnet 506, which may be interpreted by controller 160 to determine the position of door 116. Sensor 508 generates a distinct signal and direction impulse for every increment of a turn, e.g., first magnet 504 and second magnet 506 may generate two pulses for every full rotation of wheel 500. As stated above, sensor 508 may be configured to read modulation or pulses in magnetic field strength, either as a continuously varying field strength, in discrete steps in strength, or as a binary above-or-below threshold measurement as a measure of the rotation of pully 400. Controller 160 may be in communication with sensor 508, and controller 160 may count signal(s) from sensor 508 based on direction to determine the active rotation of wheel 500, in terms of number of rotations, which may be correlated to the position of door 116, e.g., the rate of change of door position detected by sensor 508 may correlate to door speed.

Figure 6:
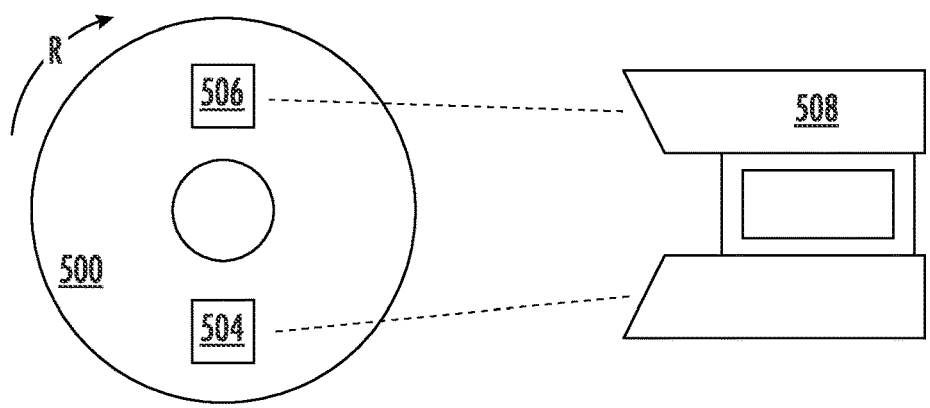
FIGS. 6 through 9 provide schematic views of the pulley system from FIG. 5 in various sensing arrangements.
Figure 7:
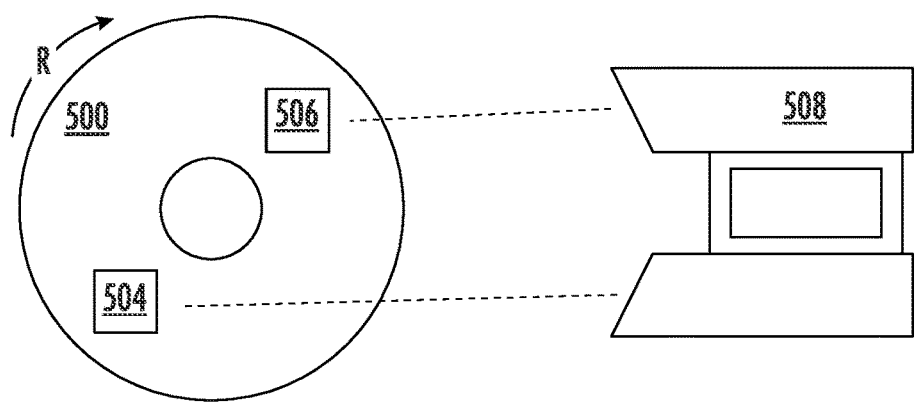
Figure 8:
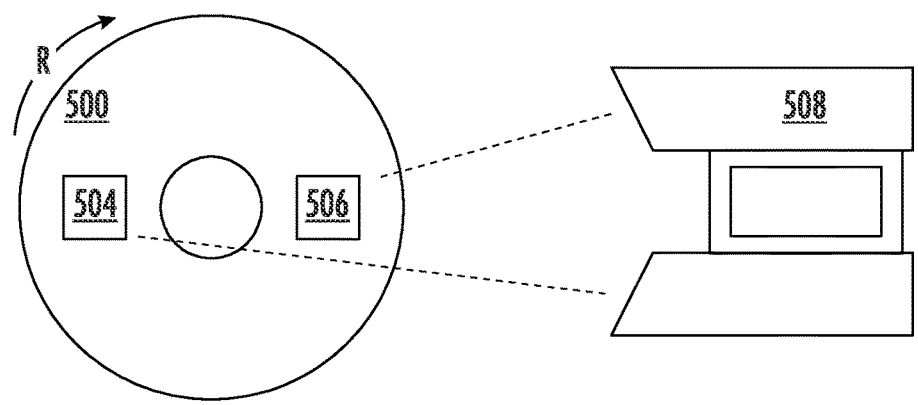
Figure 9:
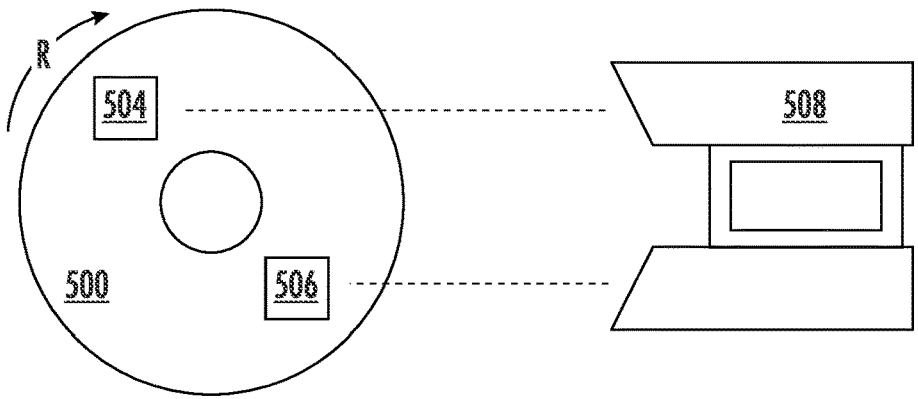

For example, as seen in FIG. 6, first magnet 504 and second magnet 506 may be equidistant from sensor 508. As wheel 500 rotates, in direction R, through FIGS. 7, 8, and 9, the distance between sensor 508, first magnet 504, and second magnet 506 may either increase or decrease. Direction R is provided by way of example only, as the direction may change depending on the position of door 116 when being rotated. Sensor 508 detects the change in position of first magnet 504 and second magnet 506 and the change in position may, as mentioned above, be interpreted by controller 160 to determine the position of door 116. Additionally, as seen in FIGS. 5-9, the presented example embodiment with two magnets, namely first magnet 504 and second magnet 506, is provided by way of example only. One skilled in the art would understand that a plurality of magnets, e.g., three, four, five, or more magnets, may be used in other example embodiments.

In a situation where there is slip of the wheel 500, pulley 400 is replaced, or the appliance power cycles, controller 160 may lose track of the door position. Controller 160 may be configured to receive a signal from door closure latch 118 when door 116 is in the closed position, since the door position is known to be closed when latch 118 is activated. Thus, controller 160 may use the signal from latch 118 to zero the door position every time door 116 is in the closed position.

Figure 10:
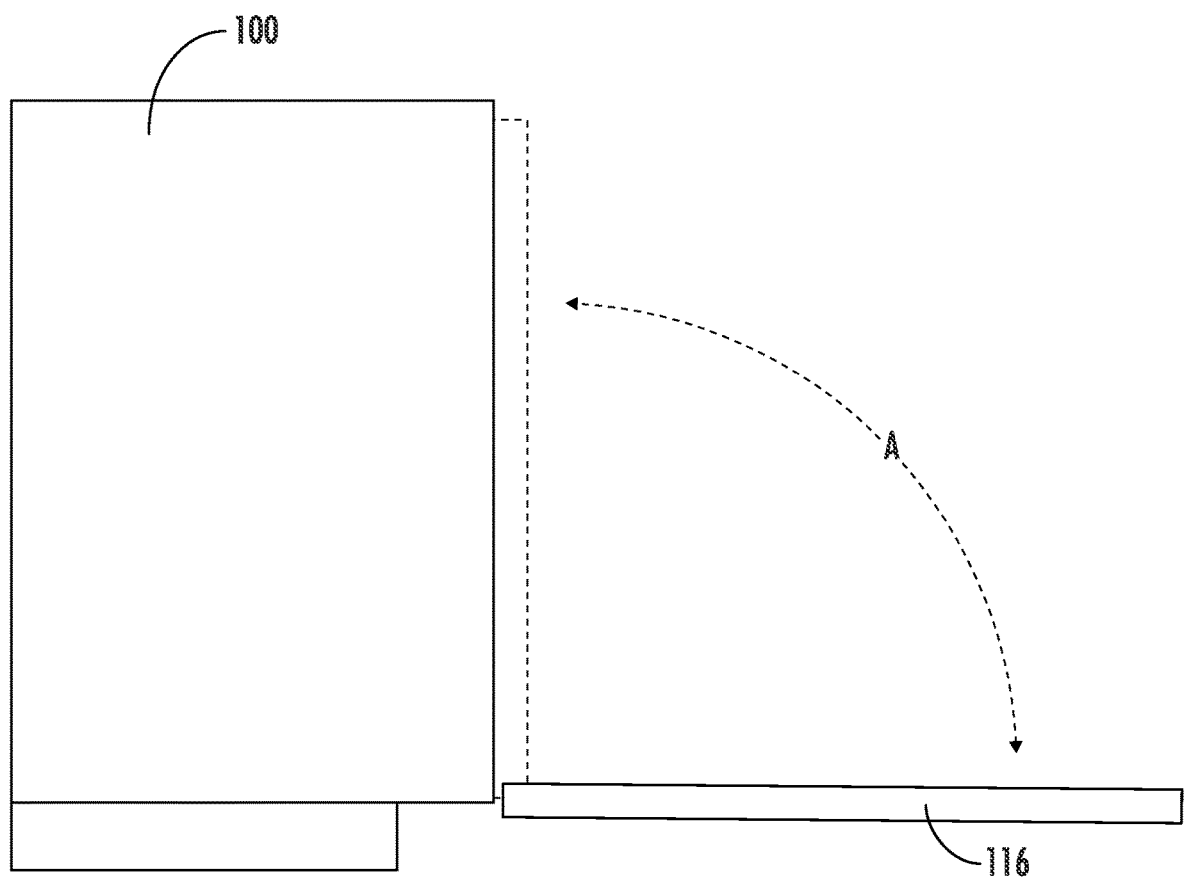
FIG. 10 provides a side view of the example dishwashing appliance of FIG. 1 with a door in an open position.

Referring now to FIG. 10, door 116 is shown in the open position with angle A between the open position and the closed position. As seen above, the position of door 116 may be determined by controller 160. The position of door 116 may then correlate to an angle A of which door 116 is rotating. For example, in the closed position door 116 angle A may be zero degrees (0°), and while in the open position door 116 is at ninety degrees (90°). Controller 160 may be configured to accept inputs from user interface 164 when door 116 is within a certain angular range of open, and not take inputs from user interface 164 when door 116 is outside of the certain angular range of open. Additionally, controller 160 may not take inputs when door 116 is moving rapidly. Inputs made by the user outside of this range are unlikely to be purposeful inputs while door 116 is moving because the user may grip around user interface 164 while opening or closing door 116. For example, controller 160 may disable inputs from the capacitive touch controls of user interface 164, or disable user interface 164, when door 116 is between ten degrees (10°) and ninety degrees (90°) from the closed position. In some example embodiments, an indicator of disabled controls may include deactivating lights in user interface 164.

As may be seen above, dishwashing appliance 100 may sense door 116 position in order to ignore accidental inputs from user interface 164. Using sensor 508 directed toward first magnet 504 and second magnet 506 on pulley 400, dishwasher appliance 100 may differentiate between a condition in which the user is likely to use user interface 164 and an alternative condition in which inputs from the user interface 164 should be ignored because intentional user inputs are unlikely. Sensor 508 may generate and send angular and directional signals to controller 160 as door 116 is opened and closed. Controller 160 may then disable user interface 164 to avoid accidental inputs. For example, the inputs may be ignored when dishwashing appliance 100 has a fully open door to extract lower rack assembly 122, or a rapidly moving door 116 as the user opens or closes door 116.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A dishwashing appliance, comprising;
   a tub defining a wash chamber;
   a door rotatably mounted to the tub, the door configured to rotate between an open position and a closed position;
   a user interface mounted on the door;
   a controller in signal communication with the user interface;
   a pulley mounted to the tub;
   a cord coupled to the door via a mounting flange at one end of the cord, the cord configured to rotate the pulley when the door is rotated between the open position and the closed position, the cord coupled to a spring at an opposite end of the cord;
   a magnet mounted to the pulley, the magnet configured to rotate with the pulley as the door is rotated; and
   a sensor mounted to the tub proximate the pulley, the sensor configured to detect the position of the magnet, wherein the controller is configured to disable the user interface based at least in part on the position of the magnet.

2. The dishwashing appliance of claim 1, wherein the user interface is mounted on a top face or a front face of the door.

3. The dishwashing appliance of claim 1, wherein the cord is one of a steel cable and a nylon rope.

4. The dishwashing appliance of claim 1, wherein the magnet is one of a plurality of magnets mounted to the pulley.

5. The dishwashing appliance of claim 1, wherein the sensor is one of a plurality of sensors mounted to the tub proximate the pulley.

6. The dishwashing appliance of claim 1, further comprising a latch on the door, the latch configured to removably secure the door to the tub in the closed position, the controller in communication with the latch and configured to zero a detected position of the door when the door is in the closed position.

7. The dishwashing appliance of claim 1, wherein the sensor comprises a magnetic rotary encoder.

8. The dishwashing appliance of claim 1, wherein the magnet is adhered to the pulley.

9. The dishwashing appliance of claim 1, wherein the magnet is mounted to the pulley such that the position of the magnet correlates to an angular position of the door.

10. The dishwashing appliance of claim 9, wherein the controller is configured to disable the user interface across an angular range of the door.

11. An appliance, comprising;
    a tub defining a wash chamber;
    a door rotatably mounted to the tub, the door configured to rotate between an open position and a closed position;
    a user interface mounted on the door;
    a controller in signal communication with the user interface;
    a pulley mounted to the tub, the pulley configured to rotate when the door is rotated between the open position and the closed position;
    a magnet mounted to the pulley, the magnet configured to rotate with the pulley as the door is rotated, the magnet comprising a first magnet and a second magnet;
    a sensor mounted to the tub proximate the pulley, the first magnet and the second magnet positioned equidistant from the sensor, the sensor configured to detect the position of the first magnet and the second magnet, wherein the controller is configured to disable the user interface based at least in part on the position of the first magnet and the second magnet.

12. The appliance of claim 11, wherein the user interface is mounted on a top face or a front face of the door.

13. The appliance of claim 11, wherein the user interface comprises capacitive touch controls.

14. The appliance of claim 11, wherein the magnet is one of a plurality of magnets mounted to the pulley.

15. The appliance of claim 11, wherein the sensor is one of a plurality of sensors mounted to the tub proximate the pulley.

16. The appliance of claim 11, further comprising a latch on the door, the latch configured to removably secure the door to the tub in the closed position, the controller in communication with the latch and configured to zero a detected position of the door when the door is in the closed position.

17. The appliance of claim 11, wherein the sensor comprises a magnetic rotary encoder.

18. The appliance of claim 11, wherein the magnet is adhered to the pulley.

19. The appliance of claim 11, wherein the magnet is mounted to the pulley such that the position of the magnet correlates to an angular position of the door.

20. The appliance of claim 19, wherein the controller is configured to disable the user interface across an angular range of the door.

* * * * *